United States Patent [19]
Jackson

[11] 3,967,869
[45] July 6, 1976

[54] FISHING TACKLE CASE
[76] Inventor: Elmo Jackson, P.O. Box 138, Orange Grove, Tex. 78372
[22] Filed: Nov. 29, 1974
[21] Appl. No.: 528,283

[52] U.S. Cl. .............................. 312/270; 312/201; 312/DIG. 33; 190/51
[51] Int. Cl.² ........................................ A47B 51/00
[58] Field of Search .......... 312/270, 208, 201, 244, 312/DIG. 33, DIG. 32; 190/51

[56] References Cited
UNITED STATES PATENTS

| | | | |
|---|---|---|---|
| 249,092 | 11/1881 | Protzen | 190/51 |
| 1,241,615 | 10/1917 | Farrow | 312/201 |
| 1,284,322 | 11/1918 | Hammond | 190/51 |
| 1,396,361 | 11/1921 | Davidson | 190/51 |
| 1,403,883 | 1/1922 | Woods | 312/201 |
| 1,610,146 | 12/1926 | Panzer | 190/51 |
| 1,893,526 | 1/1933 | Shriver | 312/DIG. 33 |
| 2,531,189 | 11/1950 | Abel | 312/270 |
| 3,186,529 | 6/1965 | Gilbert | 190/51 |
| 3,330,608 | 7/1967 | Druger, Jr. | 312/244 |
| 3,606,005 | 9/1971 | Meksula | 312/201 |

FOREIGN PATENTS OR APPLICATIONS

| | | | |
|---|---|---|---|
| 231,142 | 11/1960 | Australia | 312/DIG. 33 |
| 446,226 | 3/1968 | Switzerland | 312/DIG. 33 |

Primary Examiner—Robert L. Wolfe
Assistant Examiner—Victor N. Sakran
Attorney, Agent, or Firm—Fishburn, Gold & Litman

[57] ABSTRACT

A fishing tackle case for containing and carrying a plurality of fishing lures and other tackle therein includes a base section having walls defining an open top receptacle and a cover section hingedly mounted on the base section and having walls defining a receptacle and movable between an open position and closed position. The tackle case includes one or more containers each having walls defining a respective receptacle and a cover therefor. The base section and the cover section each have respective portions extending inwardly from the walls thereof to retain the container or containers in one of the base section and the cover section, said portions in the cover section being adapted to retain at least one of the containers in the cover section when in the open position.

7 Claims, 9 Drawing Figures

FISHING TACKLE CASE

The present invention relates to tackle carriers and more particularly to a tackle case adapted to removably retain a plurality of lure or tackle containers with one in the cover section when the cover section is in an open position.

There are many tackle boxes which have base portions with hinged covers which swing out to open position for access to trays therein. Some such boxes have a plurality of trays with connecting arms which permit the trays to move outwardly in parallel relation to expose the contents of all of the trays. In such tray movement the trays are in outboard relation overhanging the open cover. This positions the trays and contents so they are outside of the area of the bottom and can result in imbalance and tipping of the structure and spilling of lures therefrom.

The principal objects of the present invention are: to provide an improved tackle case for retaining a plurality of fishing lures therein with a stability overcoming difficulties of prior art boxes of tipping or otherwise spilling of contents; to provide such a tackle case which is easily carried and which occupies a minimum of space when stored in either an upstanding position or a flat position; to provide such a tackle case which is compact in design with increased storage capacity; to provide such a tackle case with hingedly connected sections having a length and width substantially greater than the thickness and with a handle for carrying arranged on a top side when the plane of the adjacent edge of the case and cover is in a vertical plane; to provide such a tackle case which provides a view of a large number of fishing lures at one time; to provide such a tackle case receiving a plurality of lure containers therein each have compartments sized for the largest lures, therefore, the compartments may each receive at least two small lures therein; to provide such a tackle case which is stable when in an upstanding position and in a flat in-use position with one or two lure containers supported in a cover section when the cover section is in an open position; to provide such a tackle case with proportions having similar appearance to an attache case and that is laid on a side for opening to expose tackle containing members therein; to provide such a tackle case wherein one lure container has means thereon for effecting alignment of another lure container when in the base section and for being supported on said other container when in the cover section; to provide such a tackle case adapted to store and selectively display a substantially greater number of lures and the like than the prior art; to provide such a tackle case having means in the base section and in the cover section for retaining the containers in the respective sections; and to provide such a tackle case which is flexible in use, durable in construction, to provide such a tackle case having means in the base section and in the cover section for retaining the containers in the respective sections; and to provide such a tackle case which is flexible in use, durable in construction, attractive in appearance, economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the tackle case.

Figure 1:
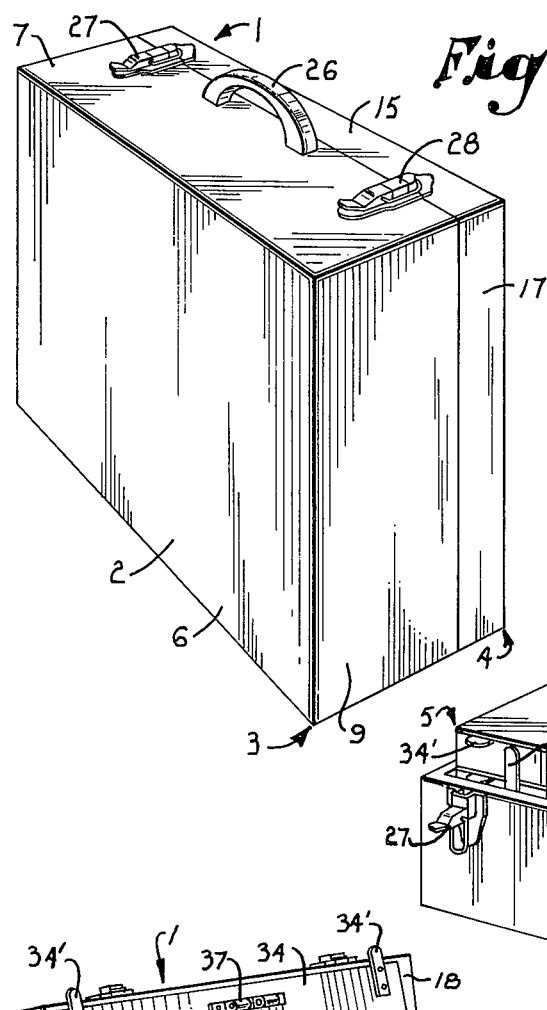
FIG. 1 is a perspective view of a tackle case embodying features of the present invention and shown in an upstanding position.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

The present invention is in a tackle case 1 that has an appearance similar to an attache case and when positioned on a side 2 and opened substantially all of the weight is over the area of the side that rests on a supporting surface thereby providing a stable structure that resists tipping when open in use. The case may be made of metal or other suitable material and is preferably molded from a synthetic resin that is highly resistant to impact and impervious to fuel, oils and the like and inert to plastic lures. The case may be made in desired colors and with a surface texture to further simulate an attache case.

In the disclosed embodiment of the present invention, the reference numeral 1 generally designates a tackle case for retaining a plurality of fishing lures therein. The tackle case 1 has a base section 3 which has the side 2 and has walls defining an open top receptacle. A cover section 4 is hingedly mounted on the base section 3 and is movable between an open position and a closed position. The tackle case 1 includes one or more containers or trays 5 with each having a cover therefor. The base section 3 and cover section 4 each have structure to retain a container or containers 5 in the base section 3 and to retain at least one of the containers or trays 5 in the cover section 4 when in the open position.

The base section 3 of the tackle case 1 has walls defining an open top receptacle. The base section 3 may be any desired shape, however, the base section 3 is illustrated as a rectangular box-like structure having a wall 6 defining the side 2 of the tackle case 1 when in an upstanding position, as shown in FIG. 1, said wall 6 serving as a support on bottom wall when the case is open. Front and rear walls 7 and 8 respectively extend from respective edges of the wall 6 and opposite end walls 9 and extend between the front and rear walls 7 and 8 to define the open top rectangular box-like receptacle, said walls 7, 8 and 9 having edges 10.

The base section 3 includes container retaining and positioning means mounted on the walls thereof to retain at least one of the containers 5 in the base section 3. The container retaining and positioning means is illustrated as a plurality of ribs or protuberances extending inwardly from the walls of the base section 3. In the illustrated structure, a pair of ribs 11 are mounted on and extend inwardly from the front wall 7 and pairs of ribs 12 extend inwardly from each of the opposite end walls 9 respectively. The ribs 11 and 12 are thereby positioned to be engaged by an outside or exterior surface of respective walls of the container or containers 5 and thereby position the containers therein.

The cover section 4 is hingedly mounted on the base section 3 and is movable between an open position and a closed position. In the illustrated structure, the cover section 4 has a wall 14 defining the other or side opposite the side 2 of the tackle case 1 when in an upstanding position, as illustrated in FIG. 1. Front and rear walls 15 and 16 respectively extend from respective edges of the wall 14 and opposite end walls 17 extend from the wall 14 and extend between the front and rear walls 15 and 16 thereby defining the open bottom rectangular box-like receptacle with the shape defined by the front, rear and end walls corresponding to the shape defined by the front, rear and end walls of the base section 3. Edges 18 of the walls 15, 16 and 17 of the cover section 4 are arranged to engage the edges 10 of the corresponding walls of the base section when in closed position. The edge 18 of the rear wall 16 of the cover section 4 has an extension or tip 16' extending inwardly from an inside surface of the rear wall 16 and terminating at an edge 18' spaced from the inside surface of the rear wall 16. The edges 10 and 18 preferably have an engagement or gaskets to provide a substantially watertight seal when closed. The rear wall 8 of the base section 3 and the rear wall 16 of the cover section 4 are hingedly connected by suitable hinges 19.

Figure 2:
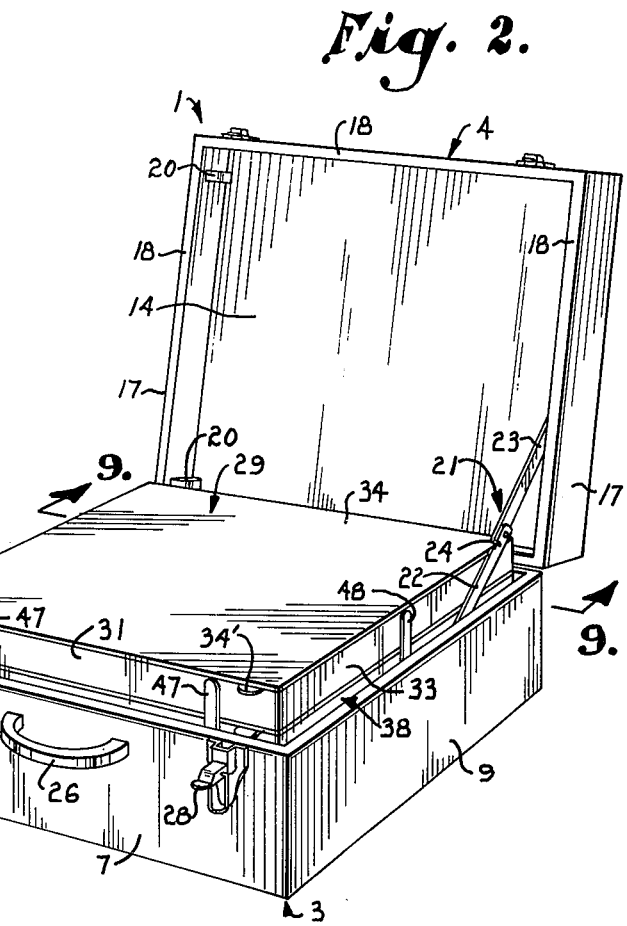
FIG. 2 is a perspective view of the tackle case shown in an in-use position and showing a cover section in an open position.
Figure 3:
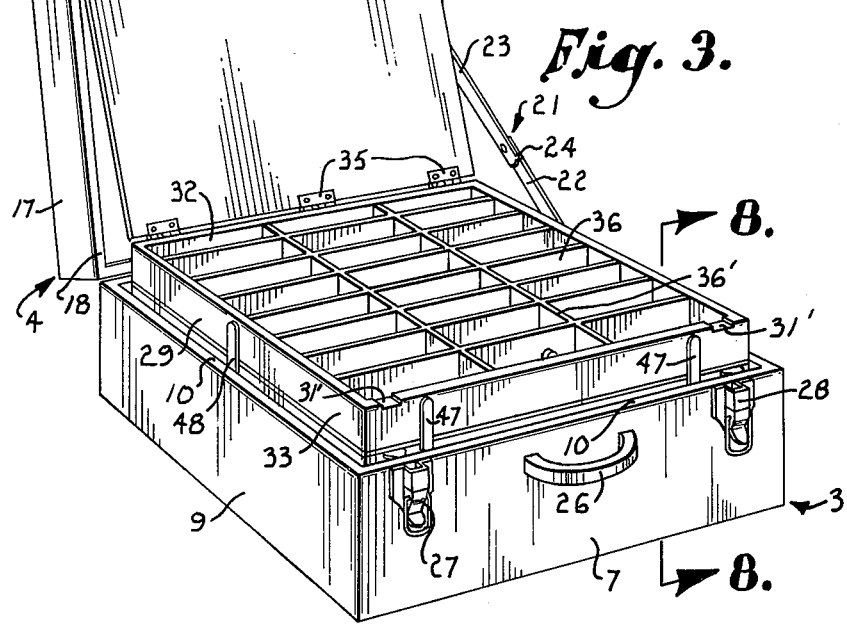
FIG. 3 is a perspective view of the tackle case and showing a cover of an uppermost lure container in an open position.

The hinges illustrated are inside stay hinges which limit the opening movement of the cover section to an angle substantially as illustrated in FIG. 2. The hinges 19 each have a first mounting portion mounted on the edge 10 of the rear wall 8 and a second mounting portion mounted on the edge 18 of the rear wall 16. The first and second mounting portions are each positioned in covering relation with recesses in the respective walls 8 and 16. A scissors like member has first and second portions pivotally connected one to the other and each having one end received in the recess in the rear wall 8 of the base section 3 and the other end received in the rear wall 16 of the cover section 4. The ends of each of the first and second scissor portions have hooks thereon which are engageable with the respective first and second mounting portions to thereby limit the opening movement of the cover section 4.

The cover section 4 also has container retaining and positioning means mounted on the walls thereof to retain at least one of the containers 5 in the cover section 4 when in an open position. In the illustrated structure, pairs of ribs or protuberances 20 extend inwardly from the opposite end walls 17 and are frictionally engageable by respective walls of the container 5 when the cover section 4 is in an open position and thereby position the container or containers therein.

The tackle case 1 includes a keeper member 21 extending between the base section 3 and the cover section 4 to cooperate with the hinges 19 in limiting opening movement of the cover section and retaining the cover section in the open position. The keeper member 21 is adapted to limit movement of the cover section 4 through an angle greater than 90° and less than 120° whereby the tackle case 1 is stable even when the cover section 4 is in the open position and has one or more containers 5 received therein.

The keeper member 21 is illustrated as having a first portion 22 having one end thereof pivotally mounted on one of the end walls 9 of the base section 3. The keeper member 21 has a second portion 23 having one end thereof pivotally mounted on one of the end walls 17 of the cover section 4. The other ends of the first and second portions 22 and 23 are pivotally connected together thereby permitting hinged movement of the cover section 4 relative to the base section 3. The keeper member 21 includes a projection 24 extending from the other end of the second portion 23 and received within a notch 25 in the first portion 22. When the projection 24 is received in the notch 25 further opening movement of the cover section 4 is prevented.

The tackle case 1 is adapted to be carried, therefore, a handle 26 is mounted on the front wall 7 of the base section 3 and suitable latches 27 and 28 have respective portions thereof mounted on the front wall 7 of the base section 3 and the front wall 15 of the cover section 4 and the latches 27 and 28 are adapted to retain the cover section 4 in a closed position.

The tackle case 1 includes one or more of the containers 5 and a first container 5 illustrated as a top container 29 when a plurality of containers 5 are stacked in the base section 3. The first or top container 29 may be any desired shape corresponding to the shape of the base section 3 and the cover section 4 and is thereby adapted to be selectively received in one of the base section 3 and the cover section 4. The first container 29 has walls defining a receptacle and is preferably of a shape corresponding to the shape of the base section 3 and the cover section 4. The illustrated first container 29 has a bottom wall 30 and front and rear walls 31 and 32 extending from respective edges of the bottom wall 30. Opposite end walls 33 extend from the bottom wall 30 and between the front and rear walls 31 and 32 to define an open top rectangular box-like receptacle which is closed by a cover 34. The cover 34 is hingedly mounted on the rear wall 32 by hinges 35.

The hinges 35 may be similar to the inside stay hinges 19 or may be of the leaf type as illustrated. A first leaf of each of the hinges 35 is suitably secured to the rear wall 32 of the first or top container 29 and a second leaf is suitably secured to the cover 34. The first and second hinge leaves are pivotally connected by a hinge pin extending through aligned eyes of the leaves.

The first lure container 29 has a plurality of spaced partitions 36 therein arranged substantially parallel to the front wall 31 and a plurality of spaced partitions 36' therein arranged substantially parallel to an end wall 33 forming a grid-like pattern defining a plurality of compartments each adapted to receive one or more fishing lures (not shown).

The cover 34 is normally closed and is retained in the closed position by a suitable friction catch or lock 37. The illustrated catch or lock 37 includes an upstanding arm positioned adjacent the front wall 31 of the first container 29. The upstanding arm is enlarged adjacent the top thereof whereby suitable spaced retainers mounted on the cover 34 are resiliently maintained in engagement with the enlarged top portion.

The spaced retainers are in facing relation and mounted on the cover 34 and are aligned with the upstanding arm. The illustrated retainers include spaced ears depending from the inside surface of the cover 34 and each having a suitable bore therein for respectively retaining a resilient member adapted to urge a contact member outwardly and into engagement with a shoulder or abutment having an aperture therein of less diameter than the contact member whereby a portion of each contact member extends beyond the respective ear for engagement with a respective side of the upstanding arm.

The cover 34 is opened by lifting on laterally spaced arms 34' mounted on the inside surface and received in respective notches or recesses 31' in an edge of the front wall 31 of the container 29. The arms 34' are illustrated as planar members which each have an end portion projecting beyond the front wall 31 of the container 29 and are easily grasped by a person for opening the cover 34.

The illustrated tackle case 1 includes a second container 38 which is engageable with the ribs 11 and 12 when the container 38 is positioned within the base section 3 as a bottom or intermediate container when stacked with like containers therein. The second container 38 has a shape and size corresponding to the shape and size of the first container 29 and is illustrated as having a bottom wall 39 with front and rear walls 40 and 41 respectively and opposite end walls 42 extending from the bottom wall 39 and arranged to define an open top rectangular box-like receptacle. The second container 38 is closed by a cover 43 hingedly mounted on the rear side wall 41 by hinges 44 and movable between an open position and a closed position.

The second container 38 also has a plurality of spaced partitions 45 therein and substantially parallel to the front wall 40 and a plurality of spaced partitions 45' substantially parallel to an end wall 42 to form a grid-like pattern and define a plurality of compartments each adapted to receive one or more fishing lures (not shown).

The hinges 44 for the second container 38 are preferably substantially similar to the hinges 35 for the first container 29. The second container 38 also has a suitable friction catch or lock 46 which is preferably substantially similar to the friction catch 37 for the first container 29. Laterally spaced arms 43' are mounted on the inside surface of the cover 43 of the second container 38 and received in respective notches or recesses in an edge of the front wall 40 of the second container 38. The arms 43' and the notches 40' are preferably substantially similar to the arms 34' and the notches 31' of the first container 29.

The second container 38 has means thereon positioned to be in engagement with the walls of the first container 29 to effect alignment of the first container 29 and the second container 38 when the second container 38 is positioned in the base section 3 and when the first container 29 is positioned in the cover section 4 with the cover section 4 in the open position.

Figure 5:
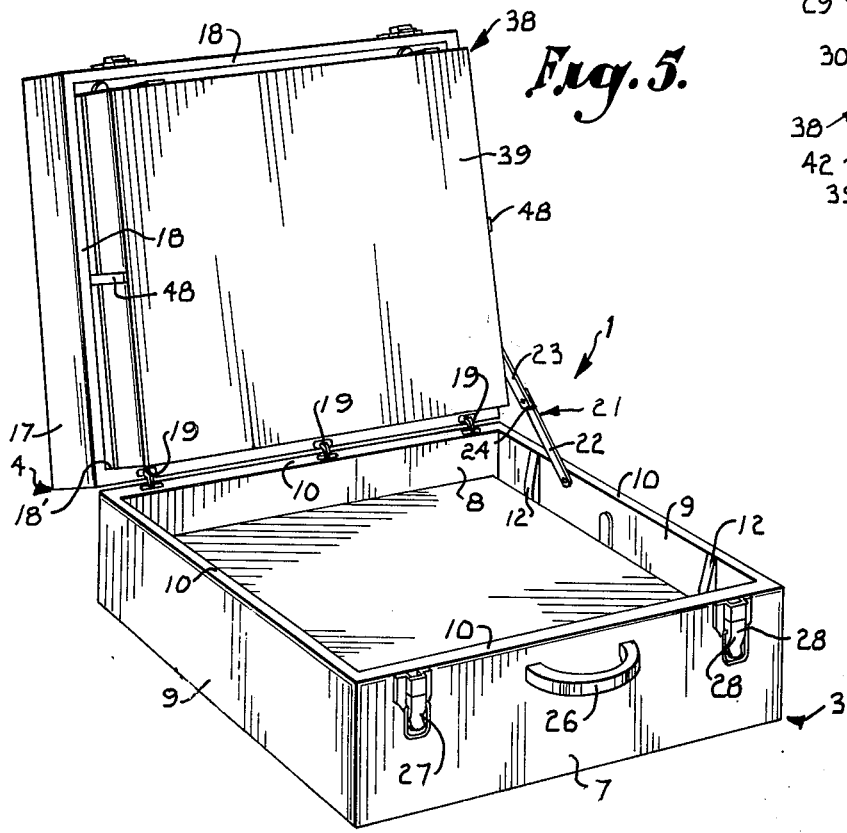
FIG. 5 is a perspective view of the tackle case and showing the second container supported on the first container while in the cover section and exposing a third container.
Figure 8:
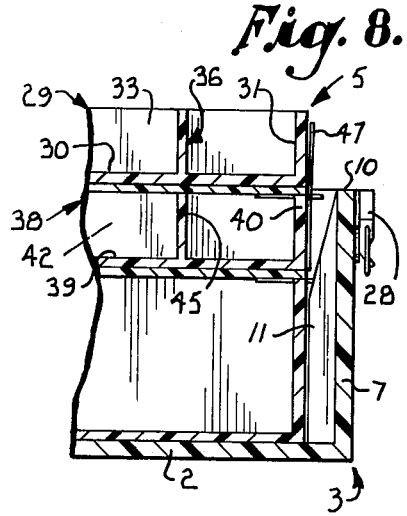
FIG. 8 is a sectional view through the tackle case taken on the line 8—8, FIG. 3.
Figure 6:
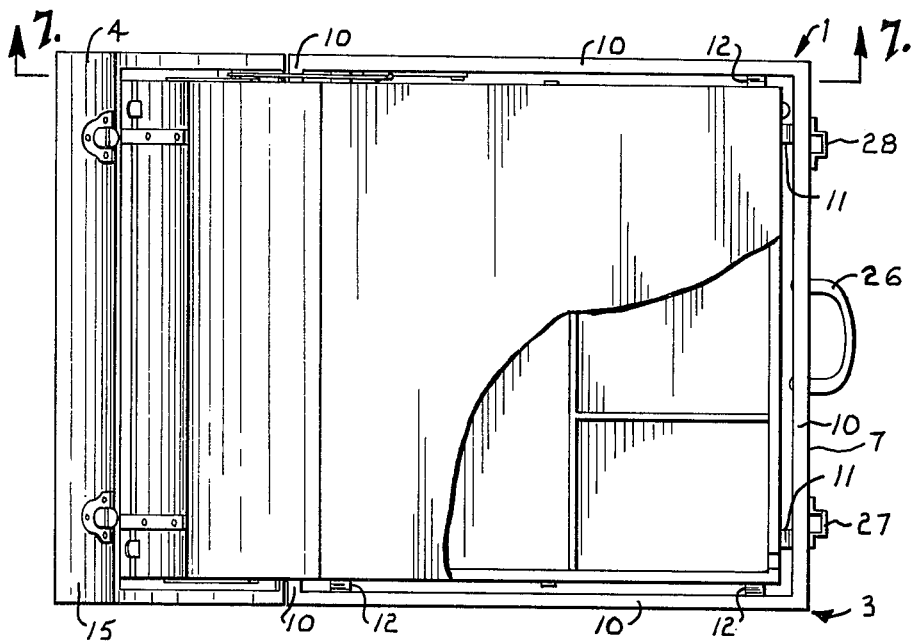
FIG. 6 is a plan view of the tackle case showing the base section and portions of the third container or containers therein removed to show compartments within the third container or containers.
Figure 7:
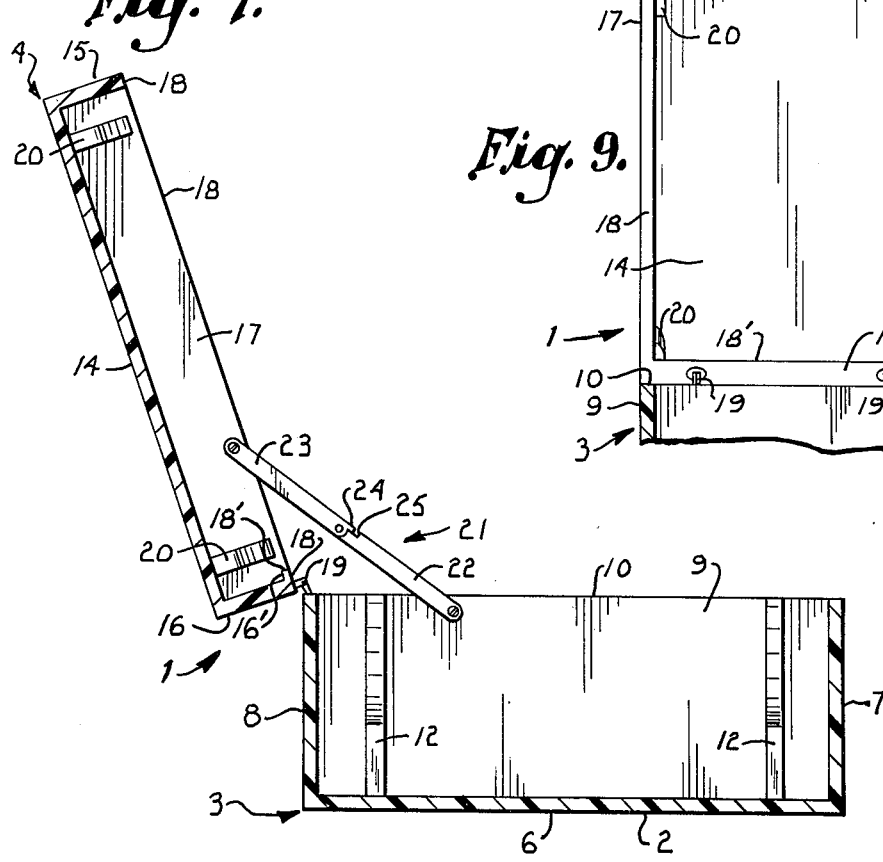
FIG. 7 is a longitudinal sectional view taken on line 7—7 of FIG. 6 and showing an interior of the cover section.
Figure 9:
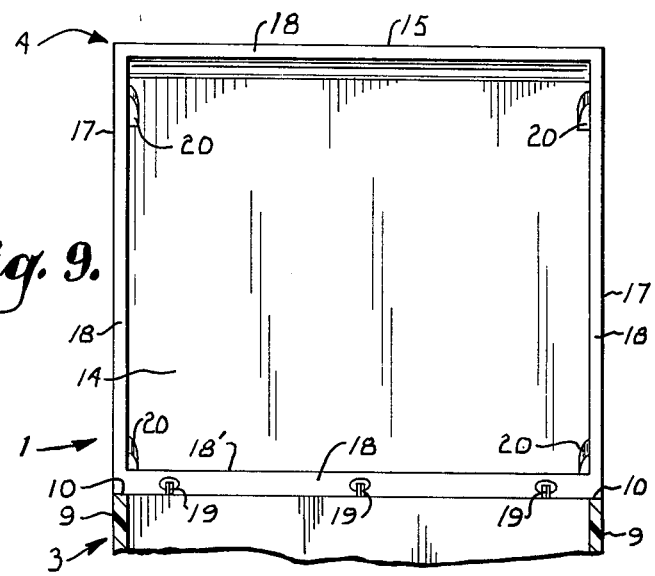
FIG. 9 is a sectional view through the tackle case taken on the line 9—9, FIG. 2.

In the illustrated structure, a pair of guide members 47 are mounted on the front wall 40 of the second container 38 and are positioned to engage an exterior or outside surface of the front wall 31 of the first container 29. At least one guide member 48 is mounted on each of the opposite end walls 42 of the second container 38 and are positioned to be in engagement with an exterior or outside surface of respective opposite end walls 33 of the first container 29, as best seen in FIG. 5. The guide members 47 and 48 support the second container 38 on the first container 29 when the first container 29 is received in the cover section 4 when same is in an open position.

The guide members 47 and 48 are illustrated as generally planar members suitably mounted on the exterior or outside surface of the front wall 40 and the end walls 42 respectively in any suitable manner, such as by screws, welding, or being formed integral therewith.

One or more containers may be mounted in the base section 3 and are preferably sized to have an exterior or outside surface of respective walls thereof in frictional engagement with end edges of the ribs 11 on the front wall 7 and the ribs 12 on the opposite end walls 9 of the base section 3. The additional container or containers are preferably all the same height and have covers adapted to support the bottom wall 39 of the second container 38 thereon. The additional containers may be special use trays, such as for plastic worms, and the like.

The tackle case 1 is a stable structure when the cover section 4 is in the open position, as illustrated in FIGS. 2 to 5 inclusive, even when the additional container or containers have been removed from the base section 3. However, the additional container or containers provided added weight to the base section 3 and thereby greater stability when the cover section 4 is in the open position and the first and second containers 29 and 38 are received in the cover section 4.

The ribs 11 and 12 on the front wall 7 and the end walls 9 define a space between the base section walls and respective adjacent walls of the containers when in the base section 3. The ribs 20 on the end walls 17 and the extension or lip 16' define a space between the cover section walls and respective adjacent walls of the first and second containers 29 and 38 when in the cover section 4.

The first container 29, second container 38, and the third container or containers in the base section 3 are the same size in plan and have respective exterior surfaces of the front, rear, and end walls thereof alignable when in engagement with the ribs 11 and 12.

Figure 4:
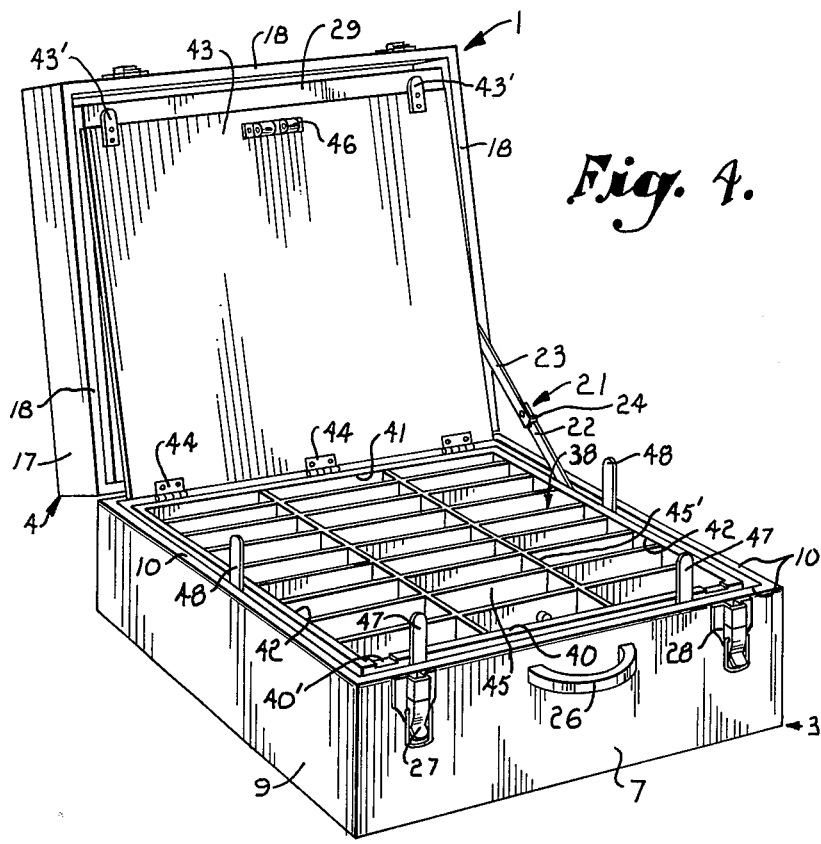
FIG. 4 is a perspective view of the tackle case and showing a first lure container retained in the case cover section and a cover of a second lure container in an open position.

In using a tackle case constructed as illustrated and described, the tackle case may be carried by the handle 26 and stored in an upstanding position as illustrated in FIG. 1 or in a flat position having the base section 3 in a position illustrated in FIG. 2 to 7 inclusive. When it is desired to select a fishing lure from the first container 29, the cover section 4 is moved to the open position and the cover moved to an open position by lifting on arms 34' mounted on the cover 34. Lifting on the arms 34' is operative to overcome the resistance of the friction catch 37 having the cooperating portions thereof mounted on the cover 34 and the front side wall 31. When it is desired to have access to the second container 38, the first container 29 is closed and placed in the cover section 4 with the exterior surface of the rear wall 32 in supported engagement with the edge 18' of the extension 16', as best illustrated in FIG. 4. The ribs 20 frictionally retain the first container 29 in the cover section 4. The cover 43 of the second container 38 is opened by lifting or applying an upwardly directed force on spaced arms 43' mounted on the cover 43 of the second container 38. The upwardly directed force overcomes resistance of the friction catch 46 having the respective portions thereof mounted on the cover 43 and the front side wall 40. When it is desired to have access to the contents of the additional container or containers in the base section 3, the second container 38 is preferably supported on the first container 29 by means of the guide members 47 and 48. The additional container or containers in the base section 3 may be opened while in the base section or may be removed therefrom for use, as desired.

It is to be understood that while I have illustrated and described one form of my invention, it is not to be limited to the specific form or arrangement of parts herein described and shown.

What I claim and desire to secure by letters patent is:

1. A tackle case comprising:
   a. a base section having walls defining an open top receptacle;
   b. a cover section hingedly mounted on said base section and movable between an open position and a closed position, said cover section having walls defining a receptacle;
   c. a first container selectively removably received in one of said base section and said cover section, said container having walls defining a receptacle and a cover hingedly mounted thereon and movable between an open position and a closed position;
   d. a second container receivable in said base section in underlying relation to said first container when said first container and second container are positioned in said base section;
   e. first and second retaining means mounted on said walls of said base section and on said walls of said cover section respectively and extending inwardly therefrom and each operative to frictionally engage said containers in the respective said base section and said cover section, said second retaining means being adapted to frictionally retain said first container in said cover section when said cover section is in the open position;
   f. said second container is frictionally engageable with said first retaining means on said walls of said base section, said second container having walls defining a receptacle and a cover hingedly mounted thereon and movable between an open position and a closed position while said second container is in said base section;
   g. a plurality of flat guide means on walls of said second container positioned to be in engagement with the exterior of corresponding walls of said first container when the cover of said second container is in closed position to effect alignment of said first container and said second container and retain said second container connected to the first container when said first container and second container are positioned in said cover section with said cover section in the open position for access to the interior of said base section; and
   h. a keeper member extending between said base section and said cover section to retain said cover section in the open position, said keeper member being adapted to limit movement of said cover section through an angle greater than ninety degrees and less than one hundred twenty degrees whereby the tackle case is stable even when said first and said second containers are received in said cover section while in the open position.

2. A tackle case as set forth in claim 1 including:
   a. said second container is frictionally engageable with said first retaining means on said walls of said base section, said second container having walls defining a receptacle and a cover hingedly mounted thereon and movable between an open position and a closed position; and
   b. upstanding flat guide means on walls of said second container and positioned to be in engagement with the exterior of corresponding walls of said first container to effect alignment of said first container and said second container when said second container is positioned in said base section and when said named container is positioned in overlying relation to said second container with said cover section in the open position to permit the first container cover to be raised for access to said first container.

3. A tackle case as set forth in claim 1 wherein said first container is engaged by said second retaining means and retained in said cover section, and said second container is engaged by said first retaining means and retained in said base section and a keeper member extends between said base section and said cover section to retain said cover section in the open position, said keeper member being adapted to limit movement of said cover section through an angle greater than ninety degrees and less than one hundred twenty degrees whereby the tackle case is stable even when said first container is received in said cover section while in the open position.

4. A tackle case as set forth in claim 1 wherein:
   a. said base section having end, front, rear and bottom walls and said cover section having end, front, rear and top walls;
   b. said first retaining means includes a plurality of ribs mounted on and extending inwardly from said end and front walls of said base section and each frictionally engageable by a respective one of the end and front walls of said containers; and
   c. said second retaining means includes a plurality of ribs mounted on and extending inwardly from said end walls of said cover section and each frictionally engageable by a respective one of the end walls of said first container when said cover section is in the open position.

5. A tackle case comprising:
   a. a base section having a bottom wall and front and rear walls and opposite end walls extending between said front and rear walls thereof to define an open top rectangular box-like receptacle;
   b. a cover section hingedly mounted on said base section and having a top wall and front and rear walls and opposite end walls extending between said front and rear walls thereof to define an open bottom rectangular box-like receptacle;

c. a first container adapted to be selectively received in one of said base section and said cover section, said first container having a bottom wall and front and rear walls and opposite end walls extending between said front and rear walls thereof to define an open top rectangular box-like receptacle, said first container having a cover hingedly mounted on said rear wall thereof and movable between an open position and a closed position, cooperative latch means on the cover and front wall of said first container to retain said cover in closed position;

d. a plurality of partitions in said first container defining a plurality of compartments therein;

e. a second container having a bottom wall and front and rear walls and end walls extending between said front and rear walls to define an open top rectangular box-like receptacle, said second container having a cover hingedly mounted on said rear wall thereof and movable between an open position and a closed position, cooperative latch means on the cover and front wall of said second container to retain said cover thereof in closed position, said second container being receivable in said base section in underlying relation to said first container when said first container and second container are positioned in said base section;

f. first retaining means mounted on and extending inwardly from said front wall and said opposite end walls of said base section and each frictionally engageable by respective front and end walls of said first and second containers; and g. second retaining means mounted on and extending inwardly from said front wall and said opposite end walls of said cover section and each frictionally engageable by respective front and end walls of said first container, said second retaining means being adapted to frictionally retain said first container in said cover section when said cover section is in the open position wherein said first container is engaged by said second retaining means and retained in said cover section and said plurality of flat guide means on the second container is engaging said first container to position said cover of the second container against the bottom wall of said first container in the cover section.

6. A tackle case as set forth in claim 5 including:

a. a plurality of partitions in said second container defining a plurality of compartments therein; and b. a plurality of flat guide means on said front wall and said opposite end walls of said second container and positioned to be in engagement with said respective front wall and opposite end walls of said first container to effect alignment of said first container and said second container when said second container is positioned in said base section with said first container positioned in overlying relation thereto and permitting moving of the cover of said first container to open position when said cover section in the open position.

7. A tackle case as set forth in claim 6 wherein said first container is engaged by said second retaining means and retained in said cover section and said plurality of flat guide means on the second container is engaging said first container to position said cover of the second container against the bottom wall of said first container in the cover section and a keeper member extends between said base section and said cover section to retain said cover section in the open position, said keeper member being adapted to limit movement of said cover section through an angle greater than ninety degrees and less than one hundred twenty degrees whereby the tackle case is stable even when said first container and said second container are received in said cover section while in the open position.

* * * * *